United States Patent [19]

Panek et al.

[11] 4,328,040
[45] May 4, 1982

[54] PROCESS FOR THE PRODUCTION OF TITANIUM DIOXIDE PIGMENTS WITH HIGH WEATHER RESISTANCE

[75] Inventors: Peter Panek; Peter Woditsch; Eckhard Bayer; Heribert Stütgens, all of Krefeld, Fed. Rep. of Germany

[73] Assignee: Bayer Aktiengesellschaft, Leverkusen, Fed. Rep. of Germany

[21] Appl. No.: 184,692

[22] Filed: Sep. 8, 1980

Related U.S. Application Data

[63] Continuation of Ser. No. 62,271, Jul. 30, 1979, abandoned.

[51] Int. Cl.$^3$ .............................................. C09C 1/36
[52] U.S. Cl. ................................ 106/300; 106/308 B; 106/299
[58] Field of Search .................. 106/300, 308 B, 299

[56] References Cited

U.S. PATENT DOCUMENTS

| | | | |
|---|---|---|---|
| 2,284,772 | 6/1942 | Seidel | 106/300 |
| 2,387,534 | 10/1945 | Seidel | 106/300 |
| 3,141,788 | 7/1964 | Whately | 106/300 |
| 3,251,705 | 5/1966 | Rieck et al. | 106/300 |
| 3,383,231 | 5/1968 | Allan | 106/300 |
| 3,926,660 | 12/1975 | Holle et al. | 106/308 B |
| 4,075,031 | 2/1978 | Allen | 106/300 |

Primary Examiner—Helen M. McCarthy
Attorney, Agent, or Firm—Sprung, Horn, Kramer & Woods

[57] ABSTRACT

The production of titanium dioxide pigments with improved chalking resistance and gloss retention by coating with an oxide and/or phosphate of zirconium and of titanium, aluminum and/or silicon, the improvement which comprises coating with zirconium by adding to an aqueous alkaline suspension of the titanium dioxide pigment of alkali metal or ammonium zirconium carbonate complex and slowly precipitating the zirconium by adding a dissolved compound of at least one of titanium, aluminum, silicon and phosphorus.

3 Claims, No Drawings

PROCESS FOR THE PRODUCTION OF TITANIUM DIOXIDE PIGMENTS WITH HIGH WEATHER RESISTANCE

This is a continuation of application Ser. No. 062,271, filed July 30, 1979 now abandoned.

By virtue of their refractive index and the high optical activities which it affords (for example scattering, lightening and covering power), titanium dioxide pigments are widely used as white pigments. However, their use for the production of paints, surface coating compositions, plastic materials and other pigmented materials which are exposed to weathering leads to products which lack the required durability. Thus, $TiO_2$-pigments occassionally give rise to the gradual disintegration of the media in which they are accommodated on exposure to ultraviolet light, for example sunlight. The gradual disintegration of the pigmented media is made apparent by a reduction in gloss and in chalking of the products.

Processes by which this disadvantage can be eliminated or considerably reduced are already known. In these processes, the pigment particles are aftertreated in thoroughly dispersed form after corresponding drying and/or wet grinding and, optionally, after grading. To this end, the individual particles have to be coated because otherwise untreated surfaces would be exposed during grinding by the disintegration of agglomerates and/or aggregates.

It is known that titanium dioxide pigments can be stabilized against the effects of weather, for example by precipitating oxide hydrates of silicon and/or aluminum from an alkaline medium by the addition of alkaline-reacting silicon and/or aluminum compounds to thoroughly dispersed pigment suspensions, followed by gradual precipitation by changing the pH-value (cf. for example U.S. Pat. No. 2,885,366). This process enables dense coating layers to be applied and leads to pigments which are more stable, the larger the quantities of inorganic aftertreatment substance applied by precipitation. Unfortunately, the optical properties of pigments treated in this way are undesirably impaired because the presence of large quantities of dense coating layers brings into play the refractive indexes of the coating substances which are distinctly lower than the refractive index of the titanium dioxide core.

In addition, it is known from U.S. Pat. Nos. 2,378,790 and 2,357,089 that titanium dioxide pigments can be more effectively stabilized against the effects of weather by precipitating titanium and/or zirconium dioxide aquate in addition to oxide hydrates of silicon and/or aluminum. The titanium and/or zirconium dioxide sources used in this process are aqueous solutions of the corresponding metal sulphates and/or metal chlorides. Unfortunately, their use is attended by disadvantages. On the one hand, the introduction of the acid-reacting titanium or zirconium salt solution into alkaline pigment suspensions gives rise at the point of entry to a momentary precipitation of titanium or zirconium oxide hydrate, with the result that the individual pigment particles are not coated in the optimal manner required. On the other hand, the addition of the strongly acidic metal salt solutions to alkaline titanium dioxide pigment suspensions gives rise on neutralization or acidification of the suspensions to flocculation of the pigment particles which, under normal working conditions, can only be completely reversed with great difficulty, even if the pigment suspensions are subsequently adjusted to pH-values above 7.5. Subsequent precipitations of oxide hydrates of silicon and/or aluminum, which undesirably accumulate in porous form where the pigment suspension is acidified, coat the pigment flocculates then present, even if the suspension is made alkaline. When, finally, the end product is micronized, these pigment flocculates break up and, in doing so, expose untreated pigment surfaces, so that pigments with only a minimally improved resistance to chalking and gloss retention are obtained.

An object of the present invention is to improve the chalking resistance and gloss retention of titanium dioxide pigments.

Accordingly, the present invention provides a process for the production of titanium dioxide pigments with improved chalking resistance and gloss retention by coating with oxides and/or phosphates of titanium, zirconium, aluminum and silicon, characterized in that the zirconium is added to an aqueous alkaline pigment suspension in the form of alkaline zirconium carbonate complexes of the alkali metals or ammonium and is slowly precipitated by the addition of dissolved compounds of titanium and/or aluminum and/or silicon and/or phosphorus.

By virtue of the process according to the invention, it is possible to apply homogeneous deposits of oxide hydrates and/or phosphates of zirconium, silicon, titanium and aluminum to titanium dioxide pigments from the entire pigment suspension, i.e. not deposits at the points where the aftertreatment chemicals are added.

Preferred embodiments of the process according to the invention will now be described in detail.

In one embodiment, titanium dioxide pigments obtained by the sulphate process or by the chloride process are suspended in water, optionally after dry-grinding, the resulting suspension is adjusted with sodium hydroxide to a pH-value above about 7.5 and, following the addition of conventional dispersion aids, such as for example alkali metal phosphates and/or alkanolamines, in quantities of less than about 1% by weight, based on titanium dioxide, is optionally subjected to wet-grinding and optionally to grading. About 0.2 to 5 parts by weight of zirconium dioxide in the form of alkaline zirconium carbonate complexes of the alkali metals or ammonium, about 0.5 to 10 parts by weight of silicon dioxide in the form of an alkaline water-glass solution and, finally, about 0.5 to 10 parts by weight of aluminum oxide in the form of an alkali metal aluminate and/or aluminum sulphate solution (all the quantities indicated being based on the titanium dioxide used) are then slowly added to the alkaline pigment suspension which contains the individual titanium dioxide particles in a thoroughly dispersed form and which has a titanium dioxide content of about 20 to 25% by weight. By using alkali metal aluminate and/or aluminum sulphate solution, the process may be controlled in such a way that the suspension has a pH-value of about 7 when the quantities of aftertreatment chemicals required for coating the pigment particles have flowed into the suspension. If necessary, the pH-value may be corrected by adding alkaline or acid-reacting aqueous solutions of compounds of titanium, aluminum, silicon or phosphorus. The pigment is then isolated in the usual way by filtration and worked up by washing, drying and micronizing, optionally in the presence of organic dispersion aids.

The dense, homogeneous deposits of the abovementioned oxide hydrates and/or phosphates, which can be obtained in accordance with the invention and which effectively cover the entire surface of the pigment particles, can only be precipitated from or in the alkaline range and thus presuppose the use of alkaline zirconium complex aqueous solutions which have a pH-value above about 8.5. Even where concentrated solutions of aftertreatment substances are used, highly weather-resistant titanium dioxide pigments can be obtained relatively inexpensively by the process according to the invention at temperatures below about 80° C. and with reasonable aftertreatment times. The process according to the invention also enables highly weather-resistant titanium dioxide pigments to be obtained even where relatively small total quantities of inorganic aftertreatment substance are used, so that, despite the application of dense coating layers, the optical activity of the pigments thus treated remains largely unaffected.

The alkaline aqueous aftertreatment solutions of zirconium carbonate complexes of the alkali metals or ammonium, which are suitable for the production of weather-resistant titanium dioxide pigments, may be produced for example by introducing zirconium sulphate solutions into alkali metal or ammonium carbonate solutions. Thus, it is possible, for example, to obtain zirconium carbonate complex solutions containing about 50 to 100 g of $ZrO_2$ per liter and having pH-values of around 9. Alkaline-reacting aqueous solutions of silicon compounds contain, for example, about 300 to 400 g/l of $SiO_2$ and about 80 to 200 g/l of $Na_2O$, whereas alkaline-reacting aqueous solutions of aluminum compounds contain about 300 to 350 g/l of $Al_2O_3$ and approximately 1.5 moles of $Na_2O$ per mole of $Al_2O_3$. In addition, the pigment suspension may be neutralized or its pH-value corrected with any metal salt solutions of titanium, silicon, aluminum or phosphorus, such as for example aqueous solutions of titanyl sulphate, titanium tetrachloride, silicon tetrachloride, aluminum sulphate, aluminum chloride, aluminum nitrate, phosphoric acid or alkali metal phosphates.

The quantities of oxide hydrates and/or phosphates of titanium, zirconium, aluminum and silicon applied by precipitation may vary within wide limits. According to the invention, highly weather-resistant titanium dioxide pigments are preferably obtained by adding an alkaline zirconium carbonate complex solution of the alkali metals or ammonium in a quantity of about 0.2 to 5% by weight, expressed as $ZrO_2$ and based on the pigment used, and additionally depositing from 0.5 to 10% by weight of $SiO_2$ and/or from 0.5 to 10% by weight of $Al_2O_3$ and/or from 0.1 to 5% by weight of $TiO_2$ in the form of oxides, hydroxides or phosphates, based in each case on the pigment used.

In order to test the titanium dioxide pigments produced in accordance with the invention, the pigments were worked into lacquers and their chalking and gloss were determined in dependence upon the weathering time. To this end, the procedure adopted was as follows:

The pigments were worked into a lacquer binder based on an alkyd resin in a pigment volume concentration of 15% and, after dispersion in a planetary mill, the lacquer was applied to aged aluminum plates. After ageing for a minimum of 8 days, the plates were weathered in a Weatherometer using the number three spraying/drying cycle of 17 minutes' duration. The chalking behavior of the lacquer films was followed by the Kempf pestle test according to DIN 53159 (ASTM) and, from the weathering time $X_1$ up to chalking stage 1 (beginning of chalking) and the time $X_5$ taken to reach chalking stage 5 (heavy chalking), and also from the comparison data for a standard pigment $S_1$ and $S_5$ (times taken by the standard pigment to reach chalking stages 1 and 5 respectively), a chalking mark was calculated in accordance with the following equation:

$$N = \left( \frac{X_1}{S_1} + \frac{X_5}{S_5} \right) \times \frac{100}{2}$$

The higher the value determined for N, the more stable the pigment is to weathering.

Gloss was measured on the same lacquer films by means of a Multigloss gloss meter at an angle of 20°. Gloss retention is expressed as the period of time in which the gloss of the sample falls to 25% of the maximum gloss by comparison with the corresponding value for the standard pigment.

The process according to the invention is illustrated by the following examples:

EXAMPLE 1

5 kg of a rutile pigment produced by the chloride process were made into a paste with sodium hydroxide, sodium metaphosphate and a mixture of mono- and diisopropanolamine as a dispersion aid in desalted water, and subjected to bead grinding for 1 hour. A suspension containing 20% by weight of titanium dioxide and having a pH-value of 9 was produced by adding more desalted water and was heated to 60° C. for aftertreatment.

In accordance with the invention, 1% by weight of $ZrO_2$, based on the pigment used, in the form of an aqueous solution of a zirconium carbonate complex of ammonium containing 50 g of $ZrO_2$ per liter and having a pH-value of approximately 9, was added to the suspension with vigorous stirring over a period of 15 minutes at a constant temperature, followed by stirring for another 30 minutes, during which the pH-value of the suspension did not change.

After concentrated sodium hydroxide had been introduced into the suspension over a period of 15 minutes, waterglass solution containing 360 g of $SiO_2$ per liter was added over a period of 60 minutes in a quantity corresponding to 3.8% by weight of $SiO_2$, based on the pigment, followed by stirring for 90 minutes. Thereafter, the suspension had a pH-value of 12. An aluminium sulphate solution containing 106 g of $Al_2O_3$ per liter was then added over a period of 180 minutes until the pH-value of the suspension reached 7, corresponding to the precipitation of 3.7% by weight of $Al_2O_3$, based on the pigment used. After stirring for 60 minutes, the suspension was filtered and the isolated pigment was repeatedly washed with desalted water, dried in a drying cabinet for 12 hours at 150° to 180° C. and then micronized in a steam jet mill.

EXAMPLE 2 (COMPARISON EXAMPLE)

For comparison, the same rutile pigment as in Example 1 was prepared for aftertreatment in the same way as described in Example 1. The aftertreatment was carried out as follows:

1% by weight of $TiO_2$ in the form of a titanyl sulphate solution containing 250 g of $TiO_2$ per liter, based on the pigment used, was added to the suspension with vigorous stirring over a period of 15 minutes at a constant temperature, followed by stirring for 30 minutes. The pH-value of the suspension fell to around 1.

This was followed (based in each case on the pigment used) by the addition of a sodium waterglass solution containing 360 g of $SiO_2$ per liter over a period of 15 minutes in a quantity corresponding to 3.8% by weight of $SiO_2$ with after-stirring for 60 minutes, by adjustment of the pH with sodium hydroxide to 7.0 over a period of 15 minutes, by the addition of sodium hydroxide over a period of 15 minutes with after-stirring for 60 minutes, and by the addition over a period of 15 minutes of 4.1% by weight of $Al_2O_3$ from an aqueous aluminum sulphate solution containing 106 g of $Al_2O_3$ per liter. The sodium hydroxide was added in such a quantity that, after the $Al_2(SO_4)_3$-solution had been added, the pigment suspension had a pH-value of approximately 8. After stirring for 120 minutes, the suspension was filtered and the isolated pigment was worked up in the same way as described in Example 1.

EXAMPLE 3 (COMPARISON EXAMPLE)

The same rutile pigment as in Examples 1 and 2 was aftertreated with the same quantities of aftertreatment substances in the same way as described in Example 2, except that, instead of 1% by weight of $TiO_2$ precipitated from a titanyl sulphate solution, 1% by weight of $ZrO_2$ was precipitated onto the pigment used from a zirconyl chloride solution containing 100 g of $ZrO_2$ per liter. Otherwise, the precipitation sequences, the precipitation times, the pH-ranges and the after-stirring times were the same as in Example 2.

Accordingly, the additions corresponded to 1% of $ZrO_2$, 3.8% of $SiO_2$ and 4.1% of $Al_2O_3$, based in each case on the pigment used. The pigment was worked up in the same way as in Example 1.

EXAMPLE 4 (COMPARISON EXAMPLE)

The same rutile pigment as in Examples 1 to 3 was prepared for aftertreatment in the same way as described in Example 1.

After concentrated sodium hydroxide had been added, Na-waterglass solution containing 360 g of $SiO_2$ per liter was added to the pigment suspension over a period of 15 minutes in a quantity corresponding to 3% by weight of $SiO_2$, followed by stirring for 15 minutes. Thereafter, the suspension had a pH-value of 12. An aluminium sulphate solution containing 106 g of $Al_2O_3$ per liter was then added over a period of 60 minutes until the pH-value of the suspension reached 7, corresponding to the precipitation of 3% by weight of $Al_2O_3$, based on the pigment used. After stirring for 60 minutes, the addition of the after-treatment chemicals just described was repeated in the same sequence without the pretreated pigment being isolated in the meantime, i.e. following the addition of the sodium hydroxide, another 3% by weight $SiO_2$ was added in the form of Na-waterglass solution, followed by the addition of another 2.5% by weight of $Al_2O_3$ in the form of an aluminum sulphate solution until a neutral reaction was obtained. After stirring for 60 minutes, the pigment was worked up in the same way as described in Example 1.

EXAMPLE 5

The same rutile pigment as in the preceding Examples was prepared for after-treatment in the same way as in Example 1.

In accordance with the invention, 1% by weight of $ZrO_2$, based on the pigment used, in the form of an aqueous solution of a zirconium carbonate complex of sodium containing 71 g of $ZrO_2$ per liter and having a pH-value of 9, was added to the alkaline-reacting pigment suspension with vigorous stirring over a period of 15 minutes at a constant temperature, followed by stirring for 30 minutes during which the pH-value of the suspension did not change.

After concentrated sodium hydroxide had been added to the pigment suspension over a period of 15 minutes, waterglass solution containing 360 g of $SiO_2$ per liter was added over a period of 60 minutes in a quantity corresponding to 3% by weight of $SiO_2$, based on the pigment used, followed by stirring for 90 minutes. Thereafter, the suspension had a pH-value of 12. An aluminum sulphate solution containing 106 g of $Al_2O_3$ per liter was then added over a period of 180 minutes until the pH-value of the suspension reached 7, corresponding to the precipitation of 3.7% of $Al_2O_3$, based on the pigment used. After stirring for 60 minutes, the pigment was worked up in the same way as described in Example 1.

The products produced in accordance with Examples 1 to 5 were tested for chalking resistance and gloss retention in the same way as described above. The results are set out in the following table.

TABLE:

| Example No. | After treatment with | Chalking mark N[1] | Gloss[2] retention |
|---|---|---|---|
| 1 | 1% of $ZrO_2$ from $CO_3$-complex<br>3.8% of $SiO_2$<br>3.7% of $Al_2O_3$ | 160 | 1.50 |
| 2 | 1% of $TiO_2$ from $TiOSO_4$-solution<br>3.8% of $SiO_2$<br>4.1% of $Al_2O_3$ | 112 | 1.14 |
| 3 | 1% of $ZrO_2$ from $ZrOCl_2$-solution<br>3.8% of $SiO_2$<br>4.1% of $Al_2O_3$ | 114 | 1.21 |
| 4 | 3% of $SiO_2$<br>3% of $Al_2O_3$<br>3% of $SiO_2$<br>2.5% of $Al_2O_3$ | 124 | 1.29 |
| 5 | 1% of $ZrO_2$ from $CO_3$-complex<br>3% of $SiO_2$<br>3.7% of $Al_2O_3$ | 144 | 1.54 |

[1] $N = \frac{X_1}{S_1} \cdot \frac{X_5}{S_5} \cdot \frac{100}{2}$

[2] $\frac{\text{Sample (time in which gloss falls to 25\% of the maximum gloss)}}{\text{Standard (time in which gloss falls to 25\% of the maximum gloss)}}$ The results set out in the table show that aftertreatment processes where premature pigment flocculation occurs because of the addition of strongly acid-reacting salt solutions to an alkaline pigment suspension and where the aftertreatment substances are not homogeneously precipitated from alkaline solution, give products with poorer chalking resistance and gloss retention (Example 2) than aftertreatment processes where the pigments are homogeneously surrounded by the dense layers of after treatment substances from alkaline solution and where pigment flocculation only occurs towards the end of the aftertreatment (Example 4).

The results set out in the table also show that aftertreatment with zirconyl chloride solutions produces a certain improvement in chalking resistance and gloss retention (Example 3) where the precipitation scheme according to Example 2 is adopted. However, the improvement is only slight so that it does not justify either the technical outlay or the cost of the zirconyl salt solution.

By contrast, a distinct improvement in the chalking resistance and gloss retention of titanium dioxide pigments is surprisingly obtained when, in accordance with the invention, an alkaline-reacting aqueous solution of a zirconium carbonate complex of the alkali metals or ammonium is slowly added to alkaline titanium dioxide pigment suspensions optionally containing conventional dispersion aids, in which the pigment particles are present in thoroughly dispersed form, before neutralization with acid-reacting compounds of titanium, aluminum, silicon or phosphorus and beyond the addition of alkaline-reacting aqueous solutions of a silicon and/or aluminum compound (Example 1 to 5).

The aftertreatment process according to the invention is further illustrated by the following examples:

EXAMPLE 6

A rutile pigment obtained by the sulphate process was prepared for aftertreatment in the same way as described in Example 1.

1% by weight of $ZrO_2$, based on the pigment used, in the form of an aqueous solution of the zirconium carbonate complex described in Example 5, was added with vigorous stirring over a period of 15 minutes at 60° C. to the alkaline pigment suspension, followed by stirring for 30 minutes during which the pH-value of the suspension did not change.

This was followed by the addition of a sodium aluminate solution containing 340 g of $Al_2O_3$ per liter over a period of 30 minutes in a quantity corresponding to 3% by weight of $Al_2O_3$, based on the pigment used, with after-stirring for 60 minutes (pH around 12), and finally by readjustment of the pH-value to pH 7.5 by the addition of 15% sulphuric acid over a period of 180 minutes.

The pigment was worked up in the same way as in Example 1.

EXAMPLE 7

A rutile pigment obtained by the sulphate process was prepared for aftertreatment in the same way as in Example 1.

1% by weight of $ZrO_2$, based on the pigment used, in the form of an aqueous solution of the zirconium carbonate complex described in Example 5, was added to the alkaline pigment suspension with vigorous stirring over a period of 15 minutes at 60° C., followed by stirring for 30 minutes during which the pH-value of the suspension did not change. This was followed by the addition over a period of 15 minutes of 2.5% by weight of $SiO_2$, based on the pigment used, in the form of a waterglass solution containing 360 g of $SiO_2$ per liter with after-stirring for 60 minutes, by the addition over a period of 90 minutes of 2.5% by weight of $Al_2O_3$, based on the pigment used, in the form of a sodium aluminate solution containing 340 g of $Al_2O_3$ per liter with after-stirring for 60 minutes and by the simultaneous addition over a period of 60 minutes (based in each case on the pigment used) of 1% by weight of $P_2O_5$ from 10% phosphoric acid solution and 1% by weight of $TiO_2$ in the form of an aqueous $TiCl_4$-solution containing 165 g of $TiO_2$ per liter. After stirring for 60 minutes, the pigment was worked up in the same way as in Example 1.

The pigments produced in accordance with Examples 6 and 7 showed high resistance to chalking and high gloss retention.

It will be appreciated that the instant specification and examples are set forth by way of illustration and not limitation, and that various modifications and changes may be made without departing from the spirit and scope of the present invention.

We claim:

1. In the production of titanium dioxide pigments with improved chalking resistance and gloss retention by coating with an oxide and/or phosphate of zirconium and of titanium, aluminum and/or silicon, the improvement which consists essentially of coating with zirconium by slowly adding to an aqueous alkaline suspension of the titanium dioxide pigment in which the pigment particles are present in thoroughly dispersed form an alkali metal or ammonium zirconium carbonate complex in aqueous solution which has a pH-value above about 8.5 and is added in about 0.2 to 5% by weight, expressed as $ZrO_2$, based on the pigment, thereafter adding an alkaline reacting aqueous solution of at least one compound of silicon and aluminum, after which the suspension has a pH-value of about 12, and slowly precipitating the zirconium by slowly adding an aqueous solution of at least one acid reacting compound of titanium, aluminum, silicon and phosphorus.

2. A process as claimed in claim 1, wherein in addition about 0.5 to 10% by weight of $SiO_2$ and/or $Al_2O_3$, based on the pigment, is precipitated in oxide, hydroxide and/or phosphate form.

3. A process as claimed in claim 1, wherein in addition about 0.1 to 5% by weight of $TiO_2$, based on the pigment, is precipitated in oxide, hydroxide and/or phosphate form.

* * * * *

UNITED STATES PATENT AND TRADEMARK OFFICE
CERTIFICATE OF CORRECTION

PATENT NO. : 4,328,040
DATED : May 4, 1982
INVENTOR(S) : Peter Panek et al

It is certified that error appears in the above—identified patent and that said Letters Patent is hereby corrected as shown below:

Title Page  Insert --Foreign Application Priority Data
Priority    Aug. 16, 1978 Fed. Rep. of Germany
            28 35 880.7--.

Signed and Sealed this

First Day of March 1983

[SEAL]

Attest:

GERALD J. MOSSINGHOFF

Attesting Officer   Commissioner of Patents and Trademarks